United States Patent [19]
Lehnert

[11] Patent Number: 5,851,934
[45] Date of Patent: Dec. 22, 1998

[54] COMPOSITE CURTAIN

[75] Inventor: Edward Lehnert, Westerville, Ohio

[73] Assignee: ASC Incorporated, Southgate, Mich.

[21] Appl. No.: 778,280

[22] Filed: Jan. 2, 1997

[51] Int. Cl.⁶ .................................................. B32B 27/12
[52] U.S. Cl. ..................... 442/288; 442/239; 442/255; 442/260; 442/261; 442/286; 442/304
[58] Field of Search .............................. 442/37, 239, 246, 442/255, 260, 261, 286, 288, 293, 304; 105/324

[56] References Cited

U.S. PATENT DOCUMENTS

| | | | |
|---|---|---|---|
| 959,178 | 5/1910 | Streat | 442/37 |
| 1,928,356 | 9/1933 | Haertel | 442/260 |
| 3,531,365 | 9/1970 | Melin | 442/288 X |
| 5,364,678 | 11/1994 | Lumb et al. | 442/261 X |
| 5,385,774 | 1/1995 | Cramer et al. | 442/260 X |
| 5,494,735 | 2/1996 | Nitta | 442/288 X |

*Primary Examiner*—Daniel Zirker
*Attorney, Agent, or Firm*—Harness, Dickey & Pierce, P.L.C.

[57] ABSTRACT

A composite curtain is provided which is light weight and provides the desired characteristics of blocking light and providing a vapor barrier.

3 Claims, 1 Drawing Sheet

COMPOSITE CURTAIN

BACKGROUND OF THE INVENTION

Field of the Invention

The present invention relates to a composite sheet material, and more particularly, a composite sheet material particularly suited for use as a curtain.

BACKGROUND AND SUMMARY OF THE INVENTION

Fabrics and other materials have been used for making curtains for hundreds of years. Curtains are designed primarily to block light and are also designed in some applications to provide a vapor barrier and insulation. In addition, it is also desirable to provide a curtain having a refined appearance and which is light weight.

Currently, curtains are made from vinyl, textiles or multiple layers of materials being sewn together. The curtains which are made from vinyl are often undesirably heavy, while curtains which are made from textiles allow light to pass through. Prior art multiple layer curtains have provided fabrics having a backing, made out of a material such as vinyl, sewn thereto. Although the prior art curtain designs have been made to meet many of the desired characteristics, including light blocking, insulating, vapor barrier, and refined appearance, these designs suffer from the problem that they are difficult to manufacture and undesirably heavy. The manufacture of the prior art multiple layer curtains require that the backing be sewn to the front panel while the curtain is turned inside out. The curtain must then be turned right side out and a final seam must be sewn. The prior art curtain designs also require hems which add additional weight to the curtains. Furthermore, because the front fabric portion and the backing must each stand up to hanging forces and wear, independently, each layer of material must be sufficiently strong to reduce stretching or sagging. Typically, the materials must be heavier in weight in order to posses such properties.

Accordingly, it is an object of the present invention to provide a composite material which can be used for curtains which is light weight, is capable of blocking light and providing a vapor barrier, and which is refined in appearance.

The present invention provides a composite sheet material including first and second fabric sheets laminated to opposite surfaces of a third sheet material disposed between the first and second fabric sheets. Preferably, the third sheet material is substantially non-translucent and substantially impermeable.

The composite sheet material according to the present invention provides a lighter weight curtain material which is refined in appearance. The center, substantially non-translucent, sheet material, along with the first and second fabric sheets, can be lighter in weight than conventional curtain materials. The weight reduction is due to the fact that each of the layers of the composite sheet material assists in supporting and strengthening the other layers which are laminated thereto. Thus, each of the first and second fabric materials can be made with a lighter weave or knit material and the third sheet material can also be made lighter weight. In addition to the reduction in weight, the curtains, according to the present invention, are less bulky to drape and store, are less likely to wrinkle, require less labor to manufacture, eliminating conventional sewing operations, take less top-covering material to produce, has significantly improved light-blocking characteristics, and require less costly hardware to fix in place and suspend. Furthermore, when the curtains of the present invention are utilized in a transportation vehicle, for example, in a cab of a truck having a sleeper section, the curtain provides a vapor barrier which will improve or reduce air transmission and thus improve the thermal control in the cab and sleeper setting. The curtain will also reduce the noise transmitted between the cab and sleeper section.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
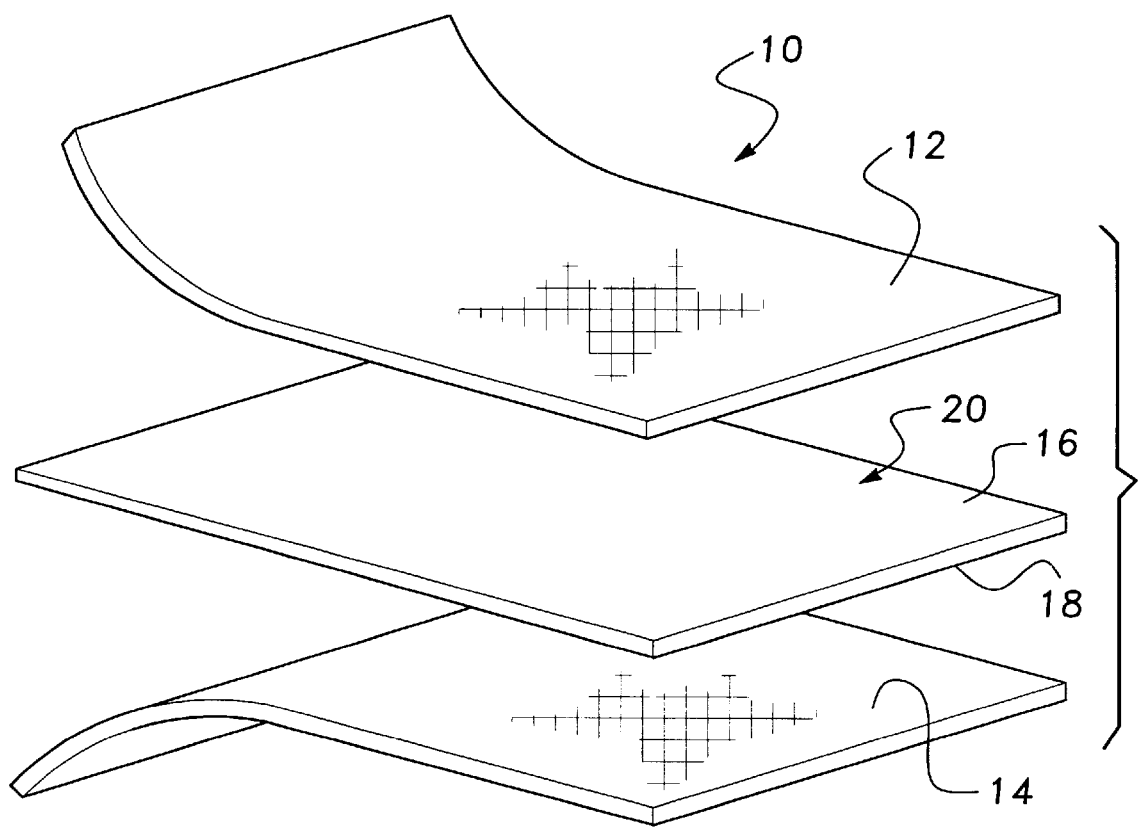
FIG. 1 is a schematic view illustrating the layers of the composite sheet material according to the principles of the present invention.
Figure 2:
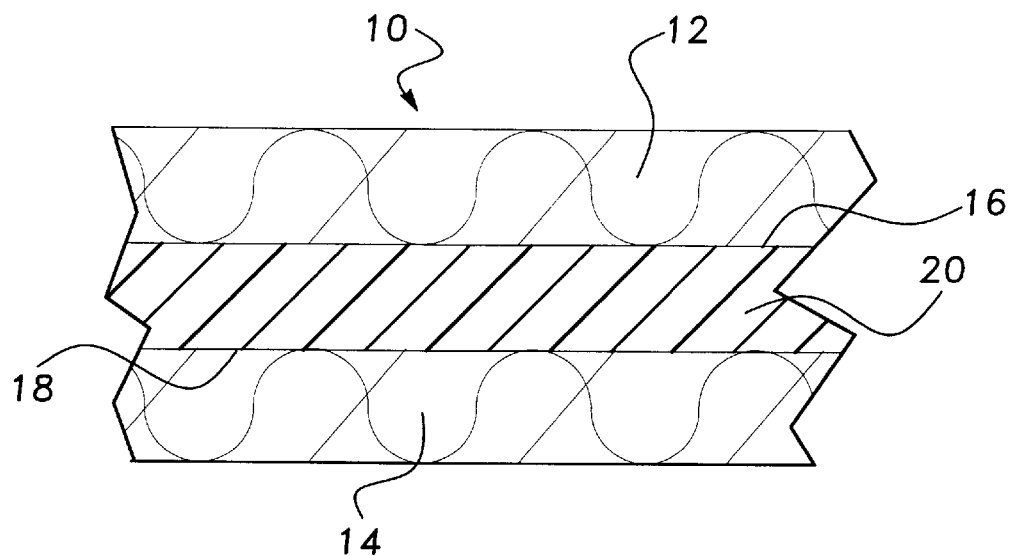
FIG. 2 is a cross-sectional view of the composite sheet material shown in FIG. 1.

With reference to FIGS. 1 and 2, the composite sheet material 10 of the present invention will be described. The composite sheet material 10 includes a front covering 12 and a back covering 14 each laminated to opposite sides 16, 18 of a center sheet material 20 which is preferably substantially impermeable and non-translucent.

The front and back coverings 12, 14 are laminated to the center sheet material 20 by an adhesive or by a heat laminating process. The front back coverings 12, 14 are preferably made from a loose weave or knit, light weight textile fabric, or can be made form a light weight vinyl material. The center sheet material 20 is preferably made from a light weight vinyl, rubber, or plastic material which is substantially non-translucent and substantially impermeable.

Each of the layers 12, 14, and 20 of the composite sheet material 10 help to support and strengthen the other layers of the composite material 10. Thus, each of the layers can be made from a lighter weight sheet material than is used with the conventional curtain design.

The method of attaching curtain composites together helps to eliminate numerous current cutting and sewing operations, while entirely eliminating internal bonding operations. Accordingly, there is a substantial reduction in the amount of labor required to manufacture the curtain of the present invention.

The composite sheet material is preferably manufactured by providing each of the layers of sheet material 12, 14, 20 on rolls which are fed through machinery which apply the front and back covering layers 12, 14 to the opposite faces 16, 18 of the center sheet material 20. If an adhesive laminating process is utilized, the adhesive may be pre-applied to the center sheet material 20 or applied just prior to application of the front and back coverings 12, 14. In a heat laminating process, the front and back coverings 12, 14 can be applied to the opposite surfaces 16, 18 of the center sheet material 20 and the layered composite is fed through a heating chamber having heating element which cause the front and back coverings to be permanently affixed to the center sheet material 20. Furthermore, alternate manufacturing methods can be used such as dielectric bonding.

Because the composite material of the present invention is produced from lighter weight materials than conventional curtain designs, the hardware required for suspending the curtain of the present invention will be lighter weight and less costly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A curtain for use in transportation vehicles, comprising:

first and second textile fabric sheets;

a vinyl sheet disposed between said first and second fabric sheets, said first and second textile fabric sheets being laminated to opposite surfaces of said vinyl sheet, said vinyl sheet being substantially non-translucent and substantially impermeable; and hardware for suspending said curtain in a vertical condition.

2. The curtain according to claim 1, wherein said first and second fabric sheets are laminated to said vinyl sheet by an adhesive.

3. The curtain according to claim 1, wherein said first and second fabric sheets are laminated to said vinyl sheet by a heat laminating process.

* * * * *